(No Model.)
D. W. BRUMMETT, Dec'd.
A. C. BRUMMETT, Administrator.
FIRE KINDLER.
No. 537,815. Patented Apr. 23, 1895.
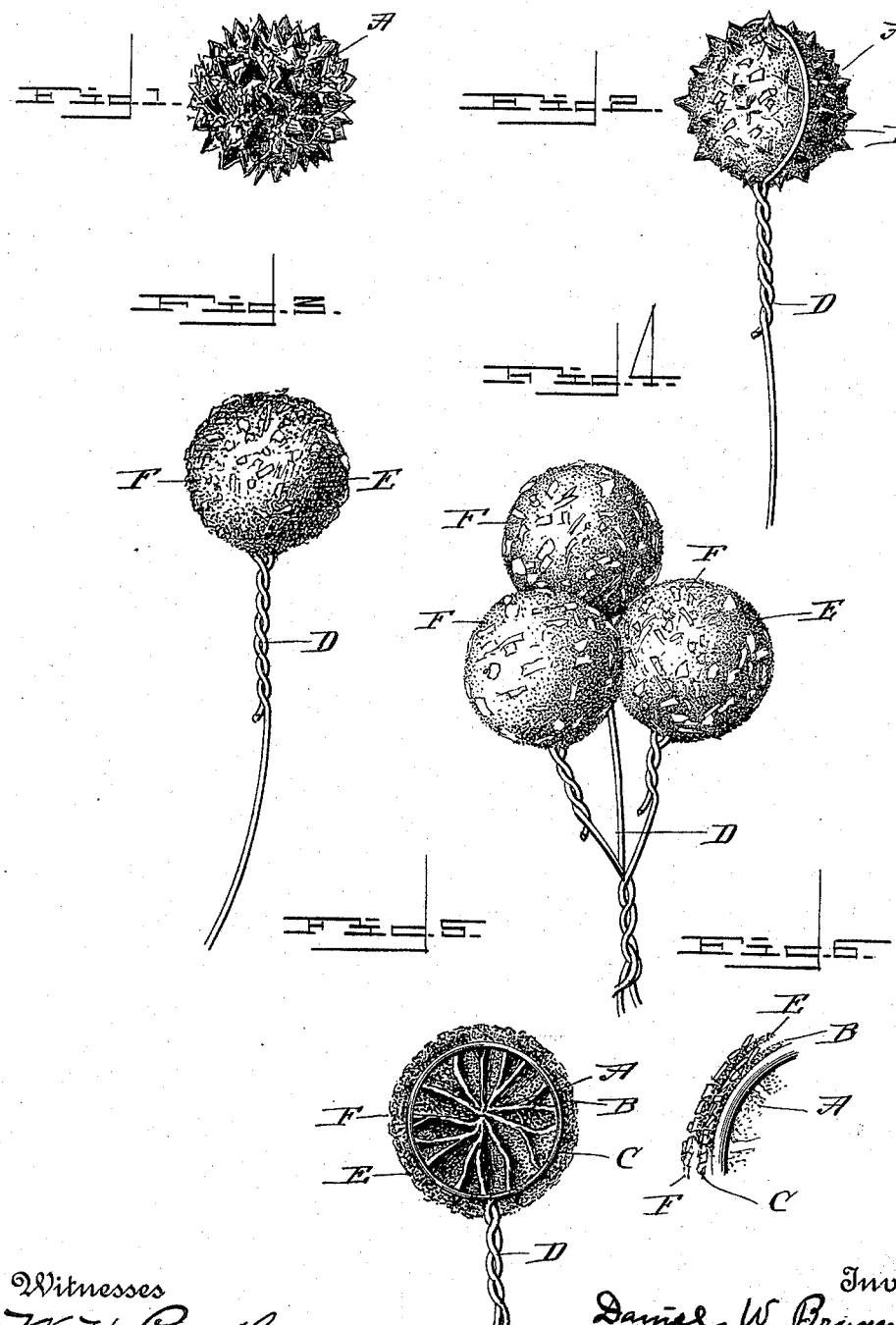
Witnesses
W. H. Pumphrey
H. N. Howard
Inventor
Daniel W. Brummett,
By Garland & May,
Attorneys

UNITED STATES PATENT OFFICE.

DANIEL W. BRUMMETT, OF CAMDEN, ARKANSAS; A. C. BRUMMETT, ADMINISTRATOR OF SAID DANIEL W. BRUMMETT, DECEASED, ASSIGNOR OF ONE-THIRD TO HEBER J. MAY, OF WASHINGTON, DISTRICT OF COLUMBIA.

FIRE-KINDLER.

SPECIFICATION forming part of Letters Patent No. 537,815, dated April 23, 1895.

Application filed October 14, 1892. Serial No. 448,800. (No specimens.)

*To all whom it may concern:*

Be it known that I, DANIEL W. BRUMMETT, a citizen of the United States, residing at Camden, in the county of Ouachita and State of Arkansas, have invented certain new and useful Improvements in Fire-Kindlers; and I do hereby declare the following to be a full, clear, and exact description of the invention, such as will enable others skilled in the art to which it appertains to make and use the same.

Reference is to be had to the accompanying drawings illustrating my invention, wherein—

Figure 1 is a view of a burr from the tree known as the sweet gum (of the genus *Nyssa*), in the natural state and before being treated according to my invention. Fig. 2 is a view of a burr while being treated according to my invention, with the wire stem or handle attached thereto. Fig. 3 is a view of a kindler complete and ready for use. Fig. 4 is a view of a bunch of fire kindlers prepared in accordance with my invention. Fig. 5 is a central sectional view of a kindler complete. Fig. 6 is an enlarged detail sectional view of a kindler complete and ready for use.

My invention relates to fire kindlers, and its object is to produce a fire kindler that is cheap, simple and effective, and it consists in treating the burr of the tree known as the sweet gum tree (of the genus *Nyssa*) with a solution of resin and turpentine, then rolling in saw dust, then applying a wire handle or stem, then dipping it in the solution of resin and turpentine, or in melted resin alone, and finally again in saw dust, all as will be more fully hereinafter described and then distinctly and specifically pointed out in the appended claim.

Similar reference signs indicate similar parts throughout the several views.

A, represents a common sweet gum (*Nyssa*) burr; B, a coating of turpentine and resin; C, a coating of saw dust; D, a wire handle or stem; E, a second coating of resin, and F a second coating of saw dust.

My method of operation is as follows:—I take dry burrs and boil them from five to ten minutes in a solution of turpentine and resin in about the proportion of one gallon of turpentine to sixteen pounds of resin. The burrs are then dipped out with a gauze dipper or any other suitable means which will permit the surplus liquid to drop back into the boiling liquid in the vessel. The burrs are then thrown into any suitable receptacle containing saw dust and thoroughly rolled therein by any suitable means. They are then removed and permitted to cool. One end of a short wire is then twisted around the burr and, then holding by the other end of the wire the burr is dipped into melted resin, or in practice and preferably they are dipped into the so'ution of turpentine and resin in which they were boiled, care being taken that they are merely dipped in and then immediately removed so that the turpentine and resin which had permeated the burr and become absorbed therein during the boiling process and subsequently solidified while being cooled, will not again melt and run off. After this "dipping" the burrs are again rolled in saw dust when my fire kindler is complete and ready for use.

By repeating the "dipping" and "rolling" processes the kindler may be increased in size to any desired extent, each repetition giving additional body to the kindler.

As is well known the burrs of the gum tree grow in great abundance throughout the Southern States, and so far as I am aware, are at present almost useless products of nature. These burrs are small, round and porous and when boiled in the solution of turpentine and resin become thoroughly impregnated with the solution, the pores and interstices becoming thoroughly filled up. By the first rolling in saw dust, particles of the saw dust adhere to the viscous liquid impregnated in the burr and thus the body of the kindler is increased by a material which, while not unnecessarily retarding the burning of the hardened turpentine and resin, prevents the same from burning too rapidly, and is at the same time of itself combustible, thus increasing the life of the kindler as well as its body.

The wire stem or handle I regard as an important feature of my invention. By wrapping the wire around the burr after the rolling in saw dust and before the first coating of turpentine and resin becomes hard and set the strands of the wire become embedded and upon further cooling and consequent hardening they become thoroughly set. The "dipping" step then completely covers the strands of wire around the burr and fixes the handle or stem absolutely making it impossible of removal. Thus is provided an efficient and simple handle which is convenient in handling and by which several kindlers can be bunched together and sold in the market as an article of manufacture, or displayed in stores, &c.

The final rolling in saw dust while unnecessary merely for the purpose of preventing sticking of contiguous kindlers in shipping or to the hands in handling inasmuch as when the kindler becomes dry and cooled after the "dipping" a hard smooth outer surface is presented, is nevertheless desirable as it lends body to the kindler and assists in the igniting of the kindler. The "dipping" also serves to bind the first or previous coating of saw dust and to incorporate it into the body of the kindler. This is true of subsequent dippings and rollings as will be readily understood. A solution of resin and turpentine possesses advantages over any other liquid of which I am aware that has heretofore been used in the process of manufacturing fire kindlers. While it is no less inflammable than the hydrocarbons heretofore employed it is not liable to spontaneous combustion in handling and storing which is the case with some liquids heretofore employed especially in warm countries. Again the solution I employ is less volatile than a solution containing a hydrocarbon and consequently the kindler does not deteriorate by reason of evaporation of the inflammable material. The water repellent properties of turpentine are well known. Besides both turpentine and resin are cheap commodities and are readily obtainable.

It will be readily understood that the burr performs an important function in that it offers a highly desirable vehicle for carrying the combustible material, and forms a nucleus around and upon which the body of the kindler is built, and which does not, of itself, form any part of the combustible material.

The uses to which my new and improved fire kindler can be applied are various and manifold. They serve not only as an efficient kindler but from the fact that they burn with a strong, steady light, without offensive odors and without dripping, they are excellent for torch light purposes. The life of a kindler of ordinary size, that is, the length of time one will burn after being ignited is from five to fifteen minutes. By increasing the size by repeated alternate dipping and rolling in saw dust the life of the kindler as well as its heating and light giving power are increased to any desired extent.

I claim as my invention and desire to secure by Letters Patent of the United States—

In a fire kindler the combination of a central cellular core, adapted to receive in the cells thereof a combustible material, a body of combustible material composed of alternate layers of turpentine and resin and sawdust, applied to said core, and a stem or handle, one end of which is twisted around the core after the cells thereof are filled with the combustible material, and bound thereto by subsequent layers, all substantially as shown and described.

In testimony whereof I affix my signature in presence of two witnesses.

DANIEL W. BRUMMETT.

Witnesses:
J. W. CRINER,
W. P. CAWTHON.